(12) United States Patent
Rhode

(10) Patent No.: US 10,981,240 B2
(45) Date of Patent: Apr. 20, 2021

(54) SAW TOOTH AND INSERT THEREFOR

(71) Applicant: U.S. Tsubaki Holdings, Inc., Wheeling, IL (US)

(72) Inventor: Jeff Tyler Rhode, Anaheim Hills, CA (US)

(73) Assignee: U.S. TSUBAKI HOLDINGS, INC., Wheeling, IL (US)

( * ) Notice: Subject to any disclaimer, the term of this patent is extended or adjusted under 35 U.S.C. 154(b) by 38 days.

(21) Appl. No.: 16/411,496

(22) Filed: May 14, 2019

(65) Prior Publication Data

US 2019/0351495 A1 Nov. 21, 2019

Related U.S. Application Data

(60) Provisional application No. 62/671,739, filed on May 15, 2018.

(51) Int. Cl.
*B23D 61/06* (2006.01)

(52) U.S. Cl.
CPC .......... *B23D 61/065* (2013.01); *B23D 61/06* (2013.01)

(58) Field of Classification Search
CPC ...... B23D 61/065; B23D 61/06; B23D 61/04; B23D 61/021; B23D 61/023; B27B 33/08
See application file for complete search history.

(56) References Cited

U.S. PATENT DOCUMENTS

| | | | |
|---|---|---|---|
| 1,037,146 A * | 8/1912 | Hunter | B23D 61/065 83/836 |
| 5,201,352 A * | 4/1993 | Hult | B23D 61/065 144/218 |
| 5,205,199 A | 4/1993 | Maclennan | |
| 5,307,719 A | 5/1994 | Maclennan | |
| 5,377,731 A * | 1/1995 | Wildey | B23D 61/065 144/218 |
| 5,579,674 A | 12/1996 | Wildey | |
| 5,644,965 A | 7/1997 | Maclennan | |
| 5,647,263 A | 7/1997 | Wildey | |
| 5,873,534 A | 2/1999 | Shinn | |
| D488,174 S | 4/2004 | East | |
| 6,725,758 B2 | 4/2004 | Maclennan | |
| D517,104 S | 3/2006 | East | |
| 8,061,396 B2 * | 11/2011 | MacLennan | B23D 61/065 144/363 |
| D772,963 S | 11/2016 | Nam | |
| D804,551 S | 12/2017 | Rhode | |
| D812,115 S | 3/2018 | Maclennan | |
| D857,768 S | 8/2019 | Rhode | |
| 10,675,695 B2 * | 6/2020 | MacLennan | B23D 61/065 |

(Continued)

*Primary Examiner* — Omar Flores Sanchez
(74) *Attorney, Agent, or Firm* — McAndrews, Held & Malloy, Ltd.

(57) ABSTRACT

A saw tooth for a saw including a square saw tooth body to be mounted on a holder and for receiving inserts fastened to inwardly sloping seating surfaces on the cutting end of the tooth body. The inserts are provided with cutting edges. Between seating surfaces, the cutting end of the tooth body defines recesses for receiving intermediate members fastened therein. The intermediate members are provided with cutting edges, and the intermediate members abut the adjoining inserts to form a cutting surface about the periphery of the cutting end of the saw tooth and help protect the saw tooth body from damage including washout.

17 Claims, 2 Drawing Sheets

(56) References Cited

U.S. PATENT DOCUMENTS

| | | | | |
|---|---|---|---|---|
| 2012/0291919 A1* | 11/2012 | Micacchi | ................ | B27B 33/08 144/241 |
| 2013/0259586 A1* | 10/2013 | Michelet | ................ | B23C 5/205 407/114 |
| 2015/0021099 A1* | 1/2015 | Shaw | ..................... | E21B 10/02 175/403 |
| 2015/0139744 A1* | 5/2015 | Harif | ...................... | B23B 27/22 407/69 |
| 2016/0288228 A1* | 10/2016 | MacLennan | ........... | B27B 33/08 |
| 2020/0015434 A1* | 1/2020 | Carson, Jr. | ............. | B23C 5/207 |

* cited by examiner

SAW TOOTH AND INSERT THEREFOR

CROSS REFERENCE TO RELATED APPLICATIONS

This application claims priority to U.S. Provisional Application No. 62/671,739 filed May 15, 2018, entitled "SAW TOOTH AND INSERT THEREFOR," the contents of which are hereby incorporated by reference in their entirety.

FIELD

The present inventions relate to the field of saw teeth. The present inventions more specifically relate to the field of saw teeth having inserts (e.g., hardened inserts).

BACKGROUND

It is known to provide replaceable saw teeth, mulcher teeth and grinder teeth for use in the cutting industries. The saw teeth may be provided with shanks or without shanks. The saw teeth are used to help protect saw blades in abrasive conditions.

It is also known to provide saw teeth with hardened or carbide inserts. The carbide helps protect and lengthen the life of the tooth and saw blade. Typical inserts are flat, triangular carbide inserts that overlie surfaces of the cutting end of the saw tooth body. These inserts may be brazed to the tooth head and may be permanently coupled or detachably coupled (e.g. to be replaceable).

In known saw teeth, adjacent inserts are known to leave gaps where the saw tooth body is exposed and left unprotected. The unprotected areas leave the saw tooth body with potentially weakened or "wash-out" areas that can cause the saw tooth body to prematurely wear out or degrade. These wash-out areas can also adversely affect the cutting performance of the saw tooth.

SUMMARY

It would be desirable to provide a saw tooth (and inserts therefor) or the like of a type disclosed in the present application that includes any one or more of these or other advantageous features:
- a saw tooth having inserts forming angled cutting edges about the periphery of the cutting end of the saw tooth, wherein the inserts and their configuration help optimize the protection of the saw tooth between inserts; and
- a saw tooth having inserts that are configured to mitigate or avoid saw tooth body "wash-out.

Accordingly, an improved saw tooth and inserts therefor are provided.

In one aspect the present disclosure provides a saw tooth comprising: a body have a mounting end, and a larger cutting end, and a plurality of sides extending between the mounting end and the cutting end, the sides forming corners where they meet; a seating surface on the cutting end of each of the corners, each seating surface sloping inwardly and defined between two edges diverging from a corresponding corner; each diverging edge extending to a recess defined in each of the sides of the body; a hardened insert fastened to each seating surface, forming a cutting corner with a pair of receding cutting edges; and a plurality of hardened members also forming a cutting edge, each hardened member fastened to each recess and abutting the hardened inserts fastened to the seating surfaces defined in part by the diverging edges extending to the recess.

In one aspect the present disclosure provides a saw tooth comprising: a body have a mounting end, and a larger cutting end, and a plurality of sides extending between the mounting end and the cutting end, the sides forming corners where they meet, and the cutting end of the body forming a perimeter; a seating surface on the cutting end of each of the corners, each seating surface sloping inwardly and defined between two edges diverging from a corresponding corner; and each seating surface extending to a recess defined in each side forming the corner for that corresponding to that seating surface; whereby separate pieces of hardened material are fastened to each of the seating surfaces and each of the recesses.

In one aspect the present disclosure provides a saw tooth comprising: a plurality of hardened inserts, each insert having a front surface, a first side having a first portion and a second portion, and a second side having a first portion and a second portion; each hardened insert provided between multiple hardened members; a plurality of hardened members, each member having a top surface, a first side wall, and a second side wall; each hardened member provided between multiple hardened inserts; and whereby the second portion of the first wall of each insert abuts a second side wall of each hardened member and the second portion of the second wall of each insert abuts a first side wall of each hardened member.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
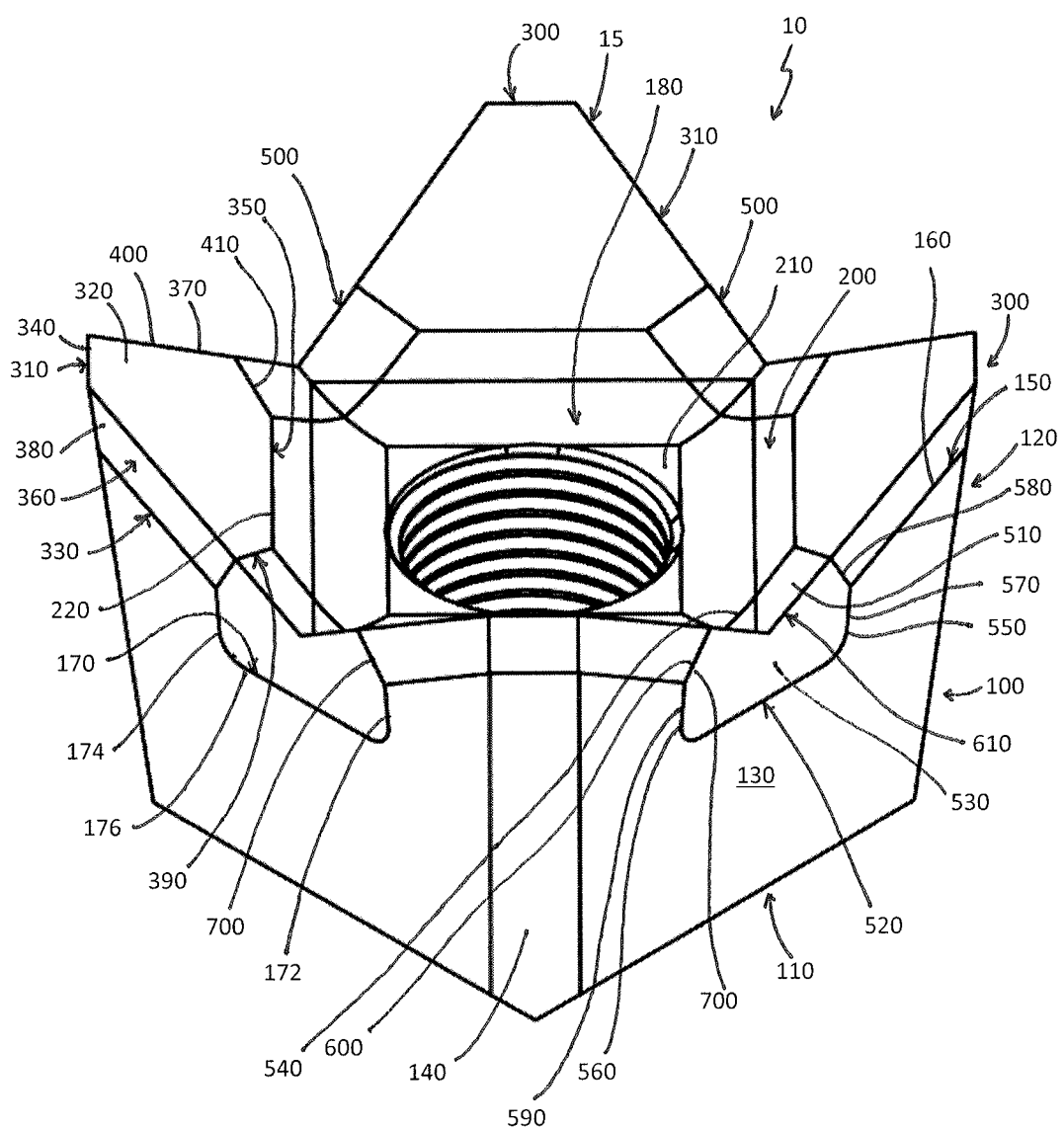
FIG. 1 illustrates a perspective view of a saw tooth, according to various examples of embodiments.
Figure 2:
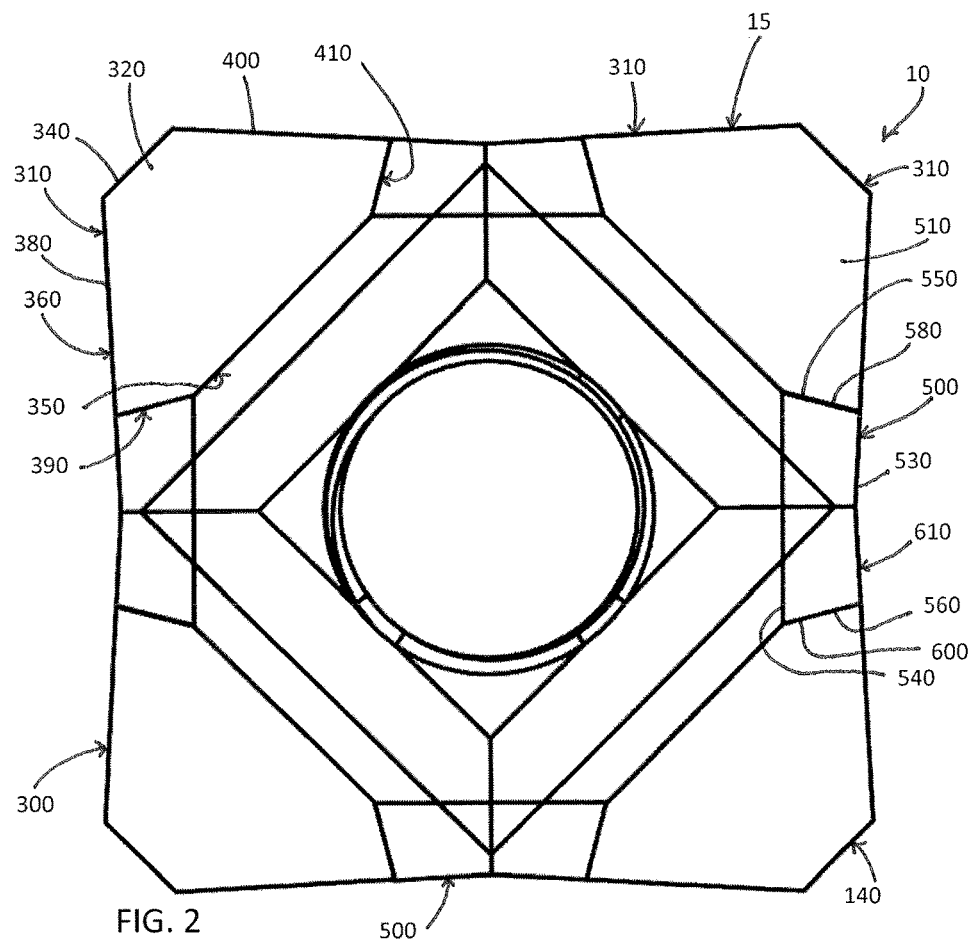
FIG. 2 illustrates a top plan view of the saw tooth of FIG. 1.
Figure 3:
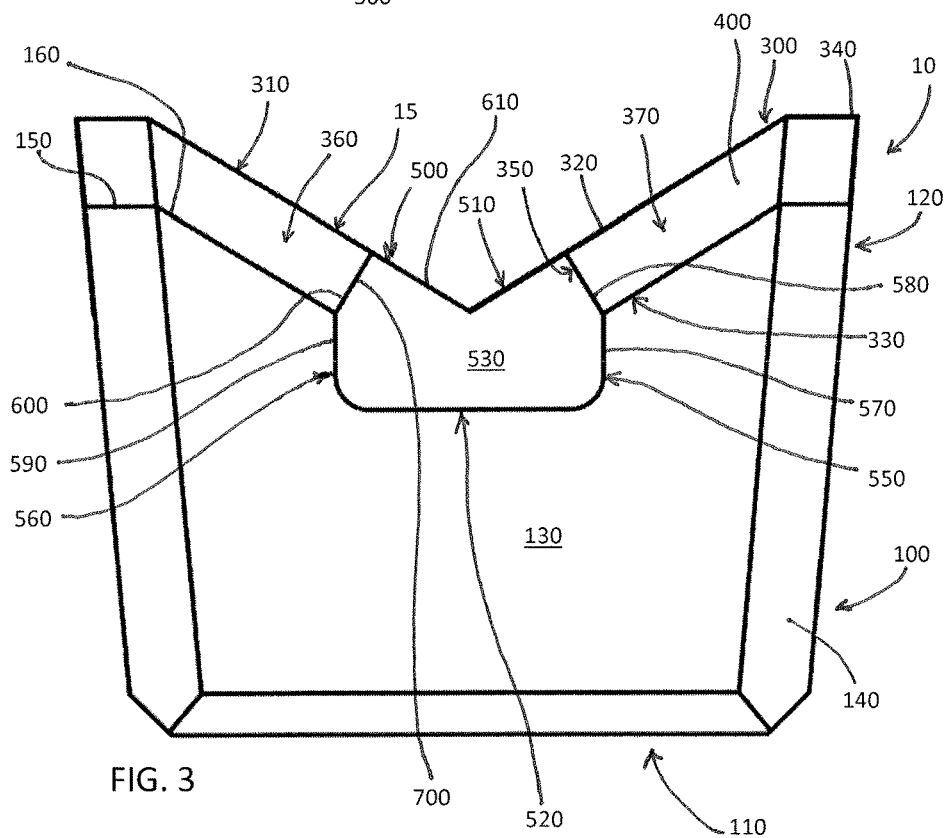
FIG. 3 illustrates a first side view of the saw tooth of FIG. 1.

Referring to the FIGS. 1-3, a four-sided saw tooth 10 is provided. The saw tooth may include a shank (not shown) or may not include a shank.

In various embodiments, saw tooth 10 is adapted to be mounted on a holder (not shown). In various embodiments, the holder is configured to be bolted or otherwise coupled to the periphery of a circular saw blade (not shown). In various embodiments, saw tooth 10 includes a tooth body 100 and four inserts 300 coupled to tooth body 100 and providing one or more cutting edges 310 about a periphery of saw tooth 10, which cutting edges 310 help make up a cutting surface 15 of saw tooth 10. In various embodiments, transitional or intermediate members 500 are provided between adjacent inserts 300 in an abutting relationship relative to one another.

Tooth body 100 includes a mounting end 110 and a cutting end 120 with four flat and slightly tapered lateral side walls 130 extending outwardly from mounting end 110 to cutting end 120, and forming a frusto-pyramidal configuration. In various embodiments, four chamfered corners 140 are formed or provided between adjoining lateral side walls 130. In various embodiments, cutting end 120 of tooth body 100 is recessed and includes or defines seating surfaces 150 corresponding to respective corners 140. In various examples of embodiments, each flat seating surface 150 slopes inwardly and is at least partially defined between two straight edges 160, diverging from corresponding corner 140.

In various examples of embodiments, each sidewall 130 of tooth body 100 helps define a channel or recess 170 between each seating surface 150 extending from corresponding side wall 130 toward a center portion 180 of tooth body 100. In various embodiments, channel or recess 170 includes side walls 172 and 174, and a bottom 176. In various embodiments, each channel 170 has a depth extending into sidewall 130 and toward mounting end 110.

In various embodiments, center portion 180 includes center bore extending through tooth body 100, cutting end 120, and through mounting ending end 110. The center bore may be provided with inner threads so that tooth body 100 can be conveniently secured to a holder of a circular saw blade. In various embodiments, each seating surface 150 is formed in a substantially trapezoidal shape with a bottom base 200 of seating surface 150 formed by a side wall 210 of center portion 180.

Inserts 300 have a uniform size and shape relative to each other, and each of inserts 300 is made of a hexagonal (e.g., irregular hexagon) and/or substantially trapezoidal piece of metal or hardened material. In various embodiments, each insert 300 includes a front surface 320, a rear surface 330, a top base 340, a bottom base 350, a first side 360, a second side 370, and a thickness between front surface 320 and rear surface 330. In various embodiments, first side 360 includes a first portion 380 and a second portion 390. In various examples of embodiments, first portion 380 of first side 360 extends between top base 340 and second portion 390 of first side 360, and second portion 390 of first side 360 extends between bottom base 350 and first portion 380 of first side 360. In various embodiments, second portion 390 of first side 360 bevels or angles inwardly toward bottom base 350 and/or second side 370. In various embodiments, second side 370 includes a first portion 400 and a second portion 410. In various examples of embodiments, first portion 400 of second side 370 extends between top base 340 and second portion 410 of second side 370, and second portion 410 of second side 370 extends between bottom base 350 and/or first portion 400 of second side 370. In various embodiments, second portion 410 of second side 370 bevels or angles inwardly toward bottom base 350 and/or first side 360.

In various embodiments, inserts 300 are prismatic (e.g., prismatic hexagons). In various embodiments, the thickness of each insert 300 is substantially uniform. However, the thickness of the inserts may taper or otherwise vary from or between the top base to the bottom base. For example, the inserts may be tapered to have more thickness in or near the top base relative to the thickness in or near the bottom base of insert.

In various embodiments, the size and shape of insert 300 corresponds to its respective or corresponding substantially trapezoidal seating surface 150 to help ensure that insert 300 fits into the frusto-pyramidal configuration of tooth body 100 when insert 300 is provided on its respective seating surface 150. In various embodiments, bottom base 350 of insert 300 rests on a ridge 220 formed by or near bottom base 200 of seating surface 150 and rear surface 330 rests on seating surface 150.

In various examples of embodiments, each insert 300 is coupled to the corresponding seating surface 150 and includes a cutting edge 310 formed of at least part of first side 360, at least part of second side 370 and top base 340. In various examples of embodiments, each insert 300 is coupled to the corresponding seating surface 150 and includes cutting edge 310 formed of at least part of first portion 380 of first side 360, at least part of first portion 400 of second side 370 and top base 340. Cutting edges 310 of each insert 300 corresponds with seating surface 150 to which insert 300 is coupled. Cutting edges 310 of inserts 300 together form most of cutting surface 15 about the periphery of cutting end 120 of tooth body 100.

In various embodiments, transitional or intermediate members 500 also have a uniform size and shape relative to each other. In various embodiments, each transitional or intermediate member 500 includes a top surface 510, a bottom surface 520, a rear face 530, a front face 540, a first side wall 550, a second side wall 560, and a thickness between front face 540 and rear face 530.

In various embodiments, first side wall 550 of transitional or intermediate member 500 includes a first portion 570 and a second portion 580. In various examples of embodiments, first portion 570 of first side wall 550 extends between bottom surface 520 and second portion 580 of first side wall 550, and second portion 580 of first side wall 550 extends between top surface 510 and first portion 570 of first side wall 550. In various embodiments, second portion 580 of first side wall 550 bevels or angles inwardly (e.g., toward top surface 510 and/or second side wall 560). In various embodiments, second side wall 560 includes a first portion 590 and a second portion 600. In various examples of embodiments, first portion 590 of second side wall 560 extends between bottom surface 520 and second portion 600 of second side wall 560, and second portion 600 of second side wall 560 extends between top surface 510 and first portion 590 of second side wall 560. In various embodiments, second portion 600 of second side wall 560 bevels or angles inwardly (e.g., toward top surface 510 and/or first side wall 550).

In various embodiments, the thickness of transitional or intermediate members 500 tapers from rear face 530 to front face 540 such that rear face 530 is thicker or has greater thickness than front face 540. However, in other embodiments, the thickness may be substantially uniform.

In various embodiments, at least a portion first side wall 550, at least a portion of second side wall 560, and bottom surface 520 of transitional or intermediate members 500 are sized and shaped to correspond to respective channels or recesses 170 defined in tooth body 100 between tooth body seating surfaces 150 to help ensure that transitional or intermediate members 500 fit and/or fit into channels or recesses 170 of tooth body 100 when transitional or intermediate members 500 are provided therein and/or are coupled thereto. In various embodiments, bottom surface 520 of transitional or intermediate member 500 rests on bottom 176 of the channel or recess 170 and first side 550 and second side 560 is provided between sides 172/174 of channel or recess 170. In various embodiments, front face 540 of transitional or intermediate member 500 abuts a front or end wall of channel or recess 170. In various embodiments, rear face 530 of transitional or intermediate member 500 extends to the margins of sidewall 130 of tooth body 100. In various embodiments, rear face 530 of transitional or intermediate member 500 is coextensive with a corresponding sidewall 130 of tooth body 100.

As illustrated in FIGS. 1-3, top surface 510 of transitional or intermediate member 500 includes a cutting edge 610 that may take a variety of shapes (and/or cross-sectional shapes). For example, cutting edge 610 of top surface 510 may be v-shaped between first side 550 and second side 560 to be coextensive with or similarly angled as cutting edges 310 of adjoining inserts 300. As another example, the cutting edge of the top surface of the transitional or intermediate member may be a straight edge.

In various examples of embodiments, insert 300 is coupled to corresponding seating surface 150 and has a cutting edge 310 formed of at least part of first side 360, at least part of second side 370 and top base 340. Cutting edge 310 of each insert 300 corresponds with seating 150 surface to which insert 300 is coupled.

In various embodiments, transitional or intermediate member 500 is coupled to channel or recess 170 of tooth body 100 and has a cutting edge 610 formed of at least part of top surface 510 and/or rear face 530. Cutting edge 310 of each insert 300 and cutting edge 610 of each transitional or intermediate member 500 together form cutting surface 15 about the periphery of cutting end 120 of tooth body 100.

In various examples of embodiments, second portion 410 of second side 370 of an insert 300 adjoining a transitional or intermediate member 500 abuts second portion 580 of first side wall 550 of transitional or intermediate member 500, and second portion 600 of second side wall 560 of intermediate or transitional member 500 abuts second portion 390 of first side 360 of adjoining insert 300. In various embodiments, second portions 580/600 of intermediate or transitional member side walls 550/560 abut second portions 390/410 of insert sides 360/370 to form joints or seams 700 that are substantially perpendicular to front surface 320 of insert 300, and/or a plane passing through front surface 320 of insert 300.

In various examples of embodiments, saw tooth 10 is provided on a periphery of a rotational saw blade with cutting end 120 as a leading end of saw tooth 10. As the saw blade is rotated and saw tooth 10 is rotated thereby in a direction of rotation, in various embodiments, joints 700 are misaligned with the direction of rotation, to reduce wear on the joint and/or saw tooth 10. It should be appreciated, however, the joint and direction of rotation of the saw tooth may be aligned in other example embodiments.

Inserts 300 and/or intermediate or transitional members 500 may be made of steel or they may be made of a hardened material such as tungsten carbide, as desired, and/or depending on the environment in which tooth 10 is being used. Inserts 300 and/or intermediate or transitional members 500 may be fastened to tooth body 100, for example, by brazing. Inserts 300 and/or intermediate or transitional members 500 may also be detachedly fastened to tooth body 100, for example, by a fastener (not shown) such as a clamp nut or bolt which retains or helps retain inserts 300 and/or against tooth body 100.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A saw tooth comprising:
  a body having a mounting end, a larger cutting end, and a plurality of sides extending between the mounting end and the cutting end, the sides forming corners, each side including a recess;

a plurality of seating surfaces on the cutting end of the body, each seating surface sloping inwardly and defined at least partially between two edges diverging from a corresponding corner, each diverging edge extending towards a respective body side recess;

a plurality of hardened inserts, each fastened to a respective seating surface, each hardened insert forming a cutting surface; and a plurality of hardened members, each forming a cutting surface, each hardened member fastened to a respective body side recess and abutting a respective hardened insert.

2. The saw tooth of claim 1, whereby the hardened inserts and hardened members are fastened to the body by brazing.

3. The saw tooth of claim 1, whereby a joint is formed where each hardened member abuts a hardened insert.

4. The saw tooth of claim 2, whereby the hardened inserts have a uniform thickness and only flat planes and straight edges.

5. The saw tooth of claim 3, whereby each joint angles toward the body at substantially perpendicular angle relative to a top surface of the hardened insert helping form the joint.

6. The saw tooth of claim 1, whereby the hardened inserts are substantially hexagonal in shape.

7. The saw tooth of claim 5, whereby the hardened inserts are irregular hexagons.

8. The saw tooth of claim 1, whereby the corners of the body are chamfered.

9. The saw tooth of claim 1, whereby the hardened members and hardened inserts form a substantially continuous cutting surface.

10. A saw tooth comprising:
a body having a mounting end, a larger cutting end, and a plurality of sides extending between the mounting end and the cutting end, the sides forming corners, the cutting end of the body forming a perimeter, each side including a recess;

a plurality of seating surfaces on the cutting end, each seating surface sloping inwardly and defined at least partially between two edges diverging from a corresponding corner, each diverging edge extending to a corresponding body side recess; and a plurality of separate pieces of hardened material fastened to each of the seating surfaces and each of the body side recesses.

11. The saw tooth of claim 10, whereby the hardened materials are fastened by brazing.

12. The saw tooth of claim 10, whereby the hardened materials are abutting.

13. The saw tooth of claim 10, whereby the hardened materials have a uniform thickness and only flat planes and straight edges.

14. The saw tooth of claim 10, whereby the hardened materials fastened to the seating surfaces are substantially hexagonal in shape.

15. The saw tooth of claim 10, whereby the and form a substantially continuous cutting surface.

16. A saw tooth comprising:
a body including a mounting portion;

a plurality of hardened inserts located above the mounting portion, each hardened insert having a front surface, a first side having a first portion and a second portion, and a second side having a first portion and a second portion;

a plurality of hardened members, each hardened member having a top surface, a first side wall, and a second side wall, each hardened member provided between multiple hardened inserts; and whereby the second portion of the first wall of each hardened insert abuts the second side wall of each respective hardened member and the second portion of the second wall of each hardened insert abuts the first side wall of each respective hardened member, and wherein each hardened insert has a different shape than each hardened member.

17. The saw tooth of claim 16, whereby the front surface of each hardened insert and at least a portion of the top surface of each hardened member are coplanar.

* * * * *